(12) United States Patent
Tseng et al.

(10) Patent No.: US 10,317,936 B2
(45) Date of Patent: Jun. 11, 2019

(54) STAND FRAME AND HINGE

(71) Applicant: HEWLETT PACKARD DEVELOPMENT COMPANY, L.P., Houston, TX (US)

(72) Inventors: In Shr Tseng, Sunnyvale, CA (US); George Janour, Santa Cruz, CA (US)

(73) Assignee: Hewlett-Packard Development Company, L.P., Spring, TX (US)

(*) Notice: Subject to any disclaimer, the term of this patent is extended or adjusted under 35 U.S.C. 154(b) by 50 days.

(21) Appl. No.: 15/023,280

(22) PCT Filed: Sep. 23, 2013

(86) PCT No.: PCT/US2013/061171
§ 371 (c)(1),
(2) Date: Mar. 18, 2016

(87) PCT Pub. No.: WO2015/041696
PCT Pub. Date: Mar. 26, 2015

(65) Prior Publication Data
US 2016/0239045 A1  Aug. 18, 2016

(51) Int. Cl.
*G06F 1/16* (2006.01)
*F16M 11/10* (2006.01)
(Continued)

(52) U.S. Cl.
CPC ......... *G06F 1/1601* (2013.01); *E05D 7/1061* (2013.01); *E05D 11/0054* (2013.01);
(Continued)

(58) Field of Classification Search
CPC .... G06F 1/1601; F16M 11/10; F16M 11/041; F16M 13/005; F16M 11/24
(Continued)

(56) References Cited

U.S. PATENT DOCUMENTS

| 5,144,290 A | * | 9/1992 | Honda | G06F 1/1616 16/306 |
| 6,430,037 B1 | * | 8/2002 | Oba | G06F 1/1601 361/679.06 |

(Continued)

FOREIGN PATENT DOCUMENTS

| CN | 1482621 | 3/2004 |
| CN | 102011920 | 4/2011 |

(Continued)

OTHER PUBLICATIONS

Turpel, P. et al., Balance-arm Tablet Computer Stand for Robotic Camera Control, International Conference on Human-Robot Interaction, Mar. 3-6, 2013.

(Continued)

*Primary Examiner* — Rockshana D Chowdhury
(74) *Attorney, Agent, or Firm* — HP Inc. Patent Department

(57) ABSTRACT

An example system in accordance with an aspect of the present disclosure includes a stand frame and a display device. The stand frame includes a stand tongue and the display device includes a hinge. The hinge is substantially concealed behind a cover portion of the display device such that only a hinge sleeve component protrudes from the display device. The stand tongue is to insert into the hinge sleeve component to attach the stand frame to the display device, and to detach from the hinge sleeve component by depression of a release button located on the hinge sleeve component.

12 Claims, 6 Drawing Sheets

(51) Int. Cl.
*F16M 13/02* (2006.01)
*E05D 7/10* (2006.01)
*E05D 11/00* (2006.01)
*F16M 11/04* (2006.01)

(52) U.S. Cl.
CPC .......... *F16M 11/041* (2013.01); *F16M 11/10* (2013.01); *F16M 13/022* (2013.01); *G06F 1/1626* (2013.01); *G06F 1/1637* (2013.01); *G06F 1/1681* (2013.01); *E05D 2011/0072* (2013.01); *F16M 2200/08* (2013.01); *G06F 2200/1631* (2013.01)

(58) Field of Classification Search
USPC ............. 361/679.2, 679.01, 679.09, 679.292
See application file for complete search history.

(56) References Cited

U.S. PATENT DOCUMENTS

| | | | | |
|---|---|---|---|---|
| 8,400,767 | B2* | 3/2013 | Yeom | F16M 11/10 248/917 |
| 8,520,371 | B2* | 8/2013 | Peng | F16M 11/105 248/447 |
| 2004/0084588 | A1* | 5/2004 | Liu | G06F 1/1601 248/291.1 |
| 2005/0253037 | A1* | 11/2005 | Kim | F16M 11/10 248/442.2 |
| 2006/0049327 | A1* | 3/2006 | Chen | F16M 11/105 248/371 |
| 2006/0076463 | A1* | 4/2006 | Drew | F16M 11/041 248/121 |
| 2007/0076363 | A1 | 4/2007 | Liang et al. | |
| 2008/0266768 | A1 | 10/2008 | Drew | |
| 2010/0149734 | A1 | 6/2010 | Sakata et al. | |
| 2013/0094127 | A1* | 4/2013 | Lu | F16M 11/041 361/679.01 |
| 2013/0194740 | A1 | 8/2013 | Moser | |

FOREIGN PATENT DOCUMENTS

| | | | |
|---|---|---|---|
| EP | 1420202 | | 5/2004 |
| KR | 10-2004-0036005 | | 4/2004 |
| KR | 20040036005 A | * | 4/2004 |
| KR | 20-2009-0002880 | | 3/2009 |
| KR | 10-2009-0033616 | | 4/2009 |
| KR | 10-2009-0075389 | | 7/2009 |
| TW | 201044141 A | | 12/2010 |
| WO | WO-2013032465 | | 3/2013 |

OTHER PUBLICATIONS

Taiwan Application No. 103124761, Office Action dated Apr. 6, 2016, 5 pages.

\* cited by examiner

STAND FRAME AND HINGE

BACKGROUND

Today's computing environment is filled with computing systems with different architectures. These architectures range from traditional desktops to laptops to tablets to all-in-one (AiO) computers, to name a few. For tablets and laptops, the architecture generally does not comprise a stand. For AiO computers and desktops computers connected to a display, a stand is generally included to support a display device in at least a vertical position for the user to view.

BRIEF DESCRIPTION OF THE DRAWINGS

For a detailed description of various examples, reference will now be made to the accompanying drawings in which.

NOTATION AND NOMENCLATURE

Figure 1:
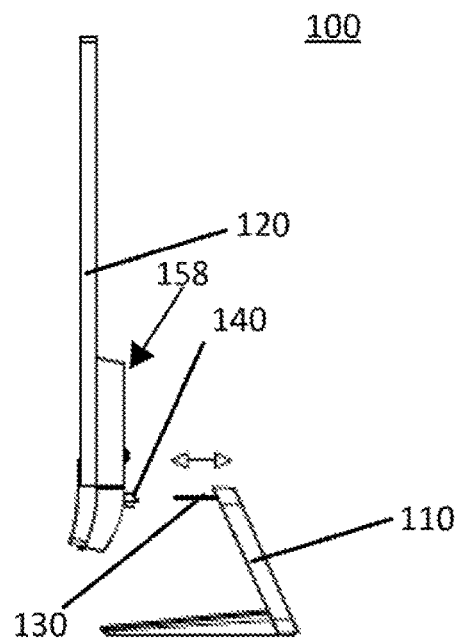
FIG. 1 depicts an example system including a stand fame detached from a display device in accordance with an aspect of the present disclosure.

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also the term "couple" or "couples" is intended to mean either an indirect or direct connection. Thus, if a first device couples to a second device, that connection may be through a direct electrical or mechanical connection, through an indirect electrical or mechanical connection via other devices and connections, through an optical electrical connection, or through a wireless electrical connection. As used herein the term "approximately" means plus or minus 10%. In addition, the term "substantially" is intended to mean being largely but not wholly that which is specified. Moreover, the term "vertical" is intended to mean upright and approximately perpendicular to the plane of the horizon. In addition, the term "horizontal" is intended to mean approximately parallel to the plane of the horizon. Furthermore, the term "all-in-one computer" or "AiO computer" should be understood to mean a display that also houses the computers mother board (in contrast to a traditional desktop configuration with a discrete display and tower computing component).

DETAILED DESCRIPTION

As mentioned in the foregoing, a stand is generally utilized to support a display device in a desktop computing system and an AiO computing system. In addition to these examples, stands are also commonly used to support display devices in retail point of sale computing systems, scientific instrument computing systems, digital signage computing systems, televisions, and the like. These stands are generally integrated into the display device chassis such that the display device and stand form one piece. Stated differently, when a user purchases the computing system (e.g., an AiO computer), the user receives the device with the stand and display device bonded to one another.

This conventional approach offers challenges to both manufacturers and users. For example, for manufacturers, a large shipping container must be used to accommodate the display device with stand bonded thereto. This shipping container is often substantially empty and filled with packaging materials due to the odd shape of the product. This is wasteful at least in terms of box size and shipping materials. On the user side, this presents a burden because the user must carry the large container. Moreover, once the container is open, the user may struggle with removing the product from the container and carrying it to a table top. This is especially true in the case of the elderly or disabled users.

Aspects of the present disclosure attempt to address at least the above-mentioned issues by providing a novel and previously unforeseen display device and stand architecture. In particular, aspects of the present disclosure provide a display device that may be easily attached to and detached from the stand that supports it. Among other benefits, this may enable the display device and stand to be shipped separately or unassembled in a single container that is smaller than the containers for conventional systems. Moreover, this allows the user to setup the product without having to lift the entire product at once. Furthermore, this provides a sleek look where the hinge may be substantially hidden from the user's view. These and other benefits will become more apparent in the detailed description below which describes various example implementations with reference to various example figures.

For example, in one implementation, a system (e.g., a monitor or AiO computer) is provided. The system comprises a stand frame including a stand tongue and a display device including a hinge. The hinge is substantially concealed behind a cover portion of the display such that only a hinge sleeve component protrudes from the display device. The stand tongue is to insert into the hinge sleeve component to attach the stand frame to the display device, and the stand tongue is to detach from the hinge sleeve component by depression of a release button located on the hinge sleeve component. The hinge may enable the display device to rotate with respect to the stand frame, and the hinge may comprise a hinge bracket that rotates with the display device while the hinge sleeve component remains stationary.

In a further example, another system is provided. The system comprises a stand frame including a substantially vertical stand tongue, and a display device including a hinge. The hinge includes a hinge sleeve component accessible from the bottom portion of the display device. The vertical stand tongue is to insert into the hinge sleeve component to attach the stand frame to the display device, and the vertical stand tongue is to detach from the hinge sleeve component by depression of a release button located on the hinge. The hinge enables the display device to rotate with respect to the stand frame, and the hinge comprises a hinge bracket which rotates with the display device while the hinge sleeve component remains stationary. In some examples, the vertical stand tongue comprises at least one protrusion and the at least one protrusion comprises an opening, and the hinge sleeve component comprises at least one capturing mechanism to engage the at least one protrusion of the vertical stand tongue when the vertical stand tongue is inserted into the hinge sleeve component.

FIG. 1 depicts an example system 100 including a stand frame 110 detached from a display device 120 in accordance with an aspect of the present disclosure. It should be readily apparent that the system 100 is a generalized illustration and that other elements may be added or existing elements may be removed, modified, or rearranged without departing from the scope of the present disclosure.

As shown, the display device 120 (e.g., a monitor, television, AiO computer, retail point of sale device, and/or tablet) is initially detached from the stand frame 110. The display device 120 may be connected to the stand frame 110 by inserting a substantially horizontal stand tongue 130 into a hinge sleeve component 140. The hinge sleeve component 140 is part of a display device hinge that is substantially concealed behind a cover portion 158 of the display device 120.

Figure 2:
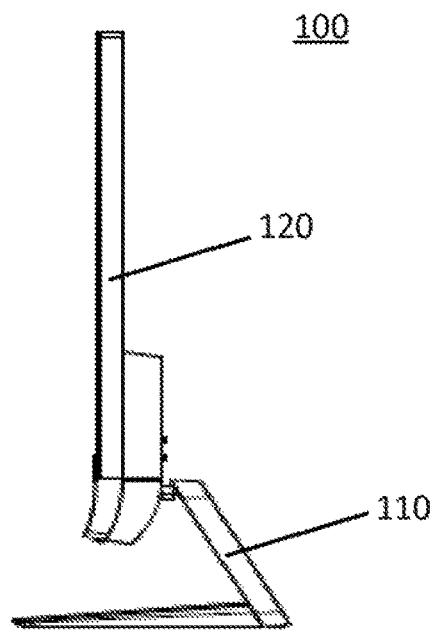
FIG. 2 depicts an example system including a stand frame attached to a display device in accordance with an aspect of the present disclosure.

FIG. 2 depicts an example system 100 including a stand frame 110 attached to the display device 120 in accordance with an aspect of the present disclosure. In particular, FIG. 2 depicts the system 100 after the horizontal stand tongue 130 is inserted into the hinge sleeve component 140. As discussed further with reference to FIGS. 3-5, the hinge sleeve component 140 includes a cavity 156 to receive the stand tongue 130. Moreover, and as discussed further with reference to FIGS. 3-5, the hinge sleeve component 140 includes at least one capturing mechanism (e.g., hooks, clips, etc.) to engage the stand tongue 130 when inserted. In the event that the user would like to detach or disengage the stand frame 110 from the display device 120, the user may depress a release button (not shown) located on the hinge sleeve component 140, and remove the display device 120 in the horizontal direction.

Figure 3:
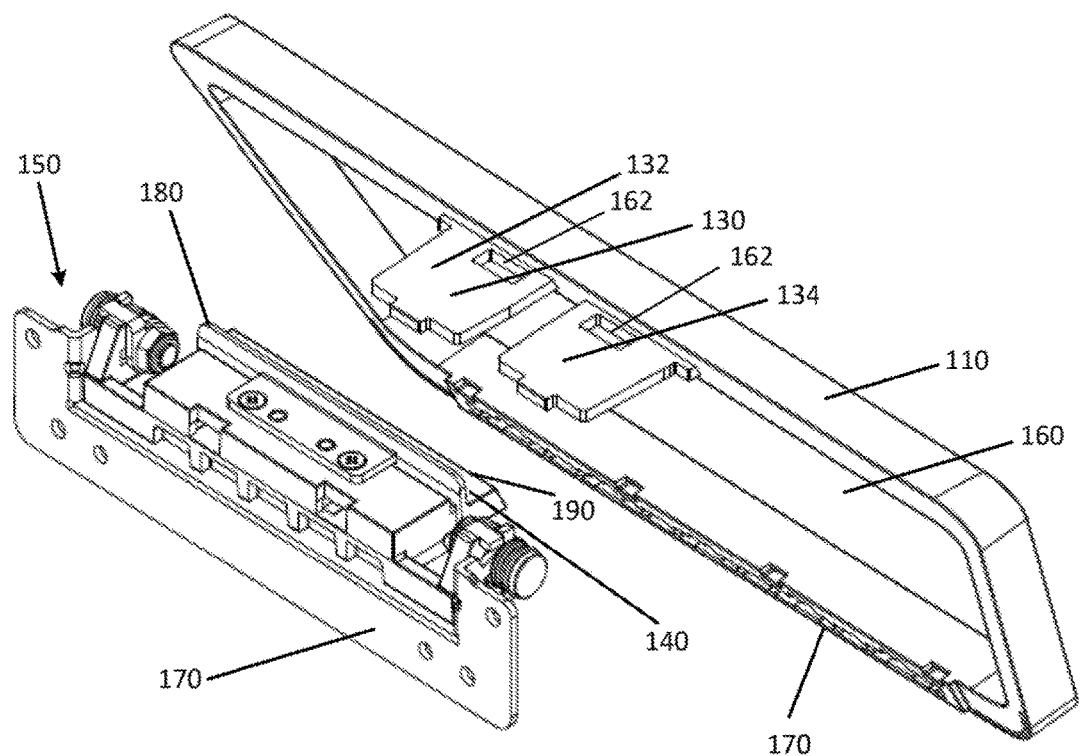
FIG. 3 depicts a close-up view of the stand frame and the hinge of the system depicted in FIG. 1 in accordance with an aspect of the present disclosure.

FIG. 3 depicts a close-up view of the stand frame 110 and the hinge 150 of the system 100 depicted in FIG. 1 in accordance with an aspect of the present disclosure. As shown, the stand frame 110 comprises a stand tongue 130, a hollow rounded rectangular portion 160, and a connector 170 to couple the stand frame 110 to the wedge-shaped base component (shown in FIGS. 1 and 2). In the example shown, the stand tongue 130 comprises a first protrusion 132 and a second protrusion 134. Each of the first protrusion 132 and second protrusion 134 includes an opening 162 to couple with the previously mentioned capturing mechanisms (e.g., hooks) of the hinge sleeve component 140.

Turning now to the hinge 150, the hinge 150 comprises a hinge bracket 170 and a hinge sleeve component 140. In various examples, the hinge bracket 170 is to couple and rotate with the display device 120 while the hinge sleeve component 140 and stand frame 110 remain stationary. Furthermore, in various examples, the hinge 150 is substantially concealed behind a cover portion of the display device (see FIGS. 1 and 2) such that only the hinge sleeve component 140 protrudes from the display device 120. More specifically, the portion of the hinge up to an including the hinge sleeve component lip 180 is concealed behind the cover portion of the display device, and only the plateau portion 190 of the hinge sleeve component is visible. Among other things, this provides a sleek look because the hinge is substantially hidden from the user and, for the most part, only the display device 120 and stand frame 110 are visible to the user.

Figure 4:
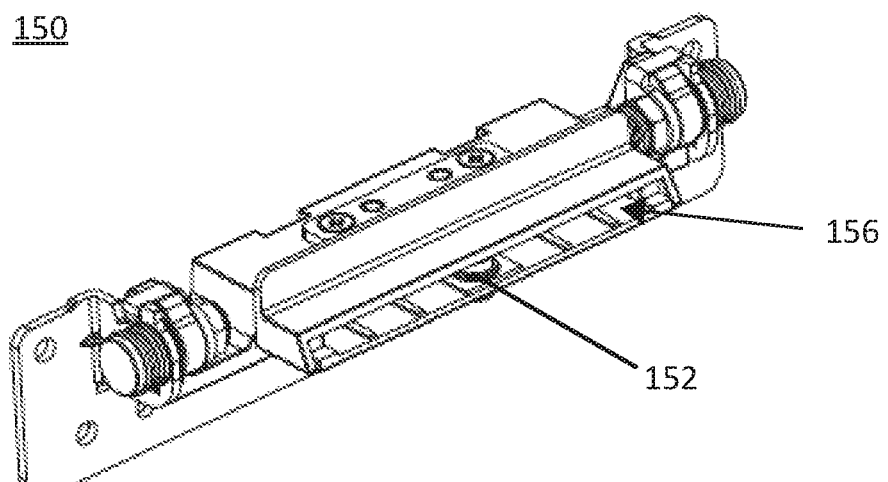
FIG. 4 depicts another close-up view of the hinge of the system depicted in FIG. 1 at a first angle in accordance with an aspect of the present disclosure.
Figure 5:
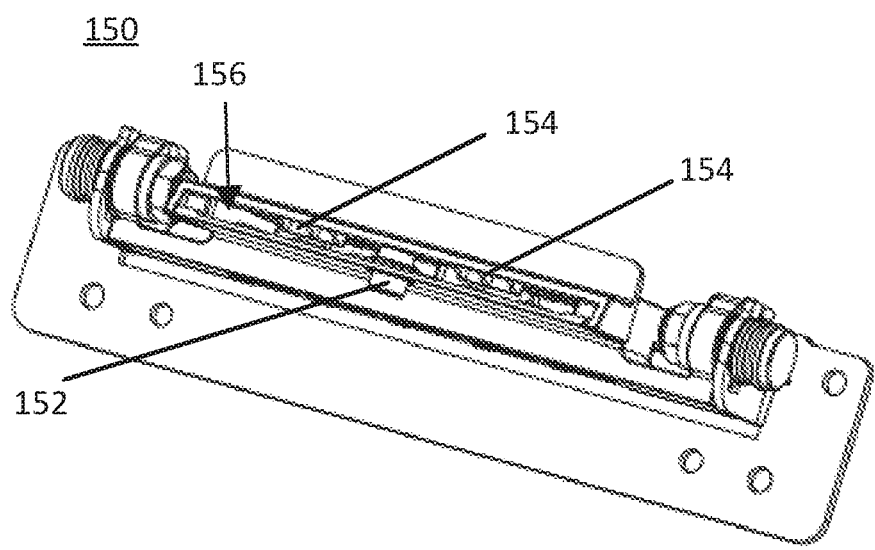
FIG. 5 depicts a further close-up view of the hinge of the system depicted in FIG. 1 at a second angle in accordance with an aspect of the present disclosure.

Looking now at FIGS. 4 and 5, these figures provide close-up view of the hinge 150 from a first angle and second angle in accordance with an aspect of the present disclosure. As can be seen, the hinge 150 includes a release button 152. The release button 152 is located in the lower portion of the hinge sleeve component 140. In some examples, when the release button 152 is depressed, it may disengage retention tabs 154 from the inserted stand tongue 130 (not shown), and thereby allow the stand tongue 130 and to be slid out from the hinge sleeve component 140 in the horizontal direction.

Figure 6:
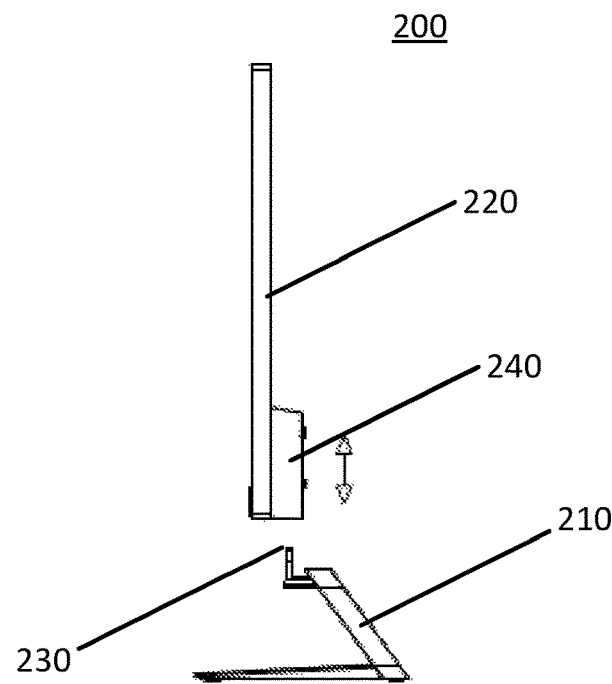
FIG. 6 depicts another example system including a stand frame detached from a display device in accordance with an aspect of the present disclosure.
Figure 7:
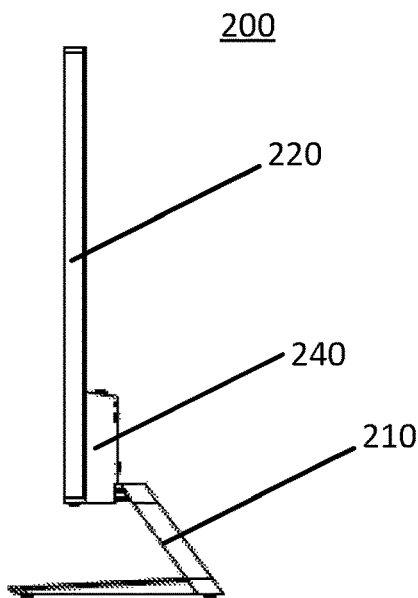
FIG. 7 depicts an example system including a stand frame attached to a display device in accordance with an aspect of the present disclosure.

Turning now to FIG. 6, this figure depicts an alternate system 200 including a stand frame 210 detached from a display device 220 (e.g., monitor, an AiO desktop computer, a tablet computer, and/or a television) in accordance with another aspect of the present disclosure. This system 200 differs from the system 100 shown in FIG. 1 insofar as the system 200 includes a substantially vertical stand tongue 230. This vertical stand tongue 230 is received from hinge sleeve component 240 accessible from the bottom portion of the display device 220. As shown in FIG. 7, to connect the stand frame 210 with the display device 220, a user simply lowers the display device 220 onto the stand frame 210 and the vertical stand tongue 230 enters the hinge sleeve component 240 and attaches thereto via an engagement mechanism.

Figure 8:
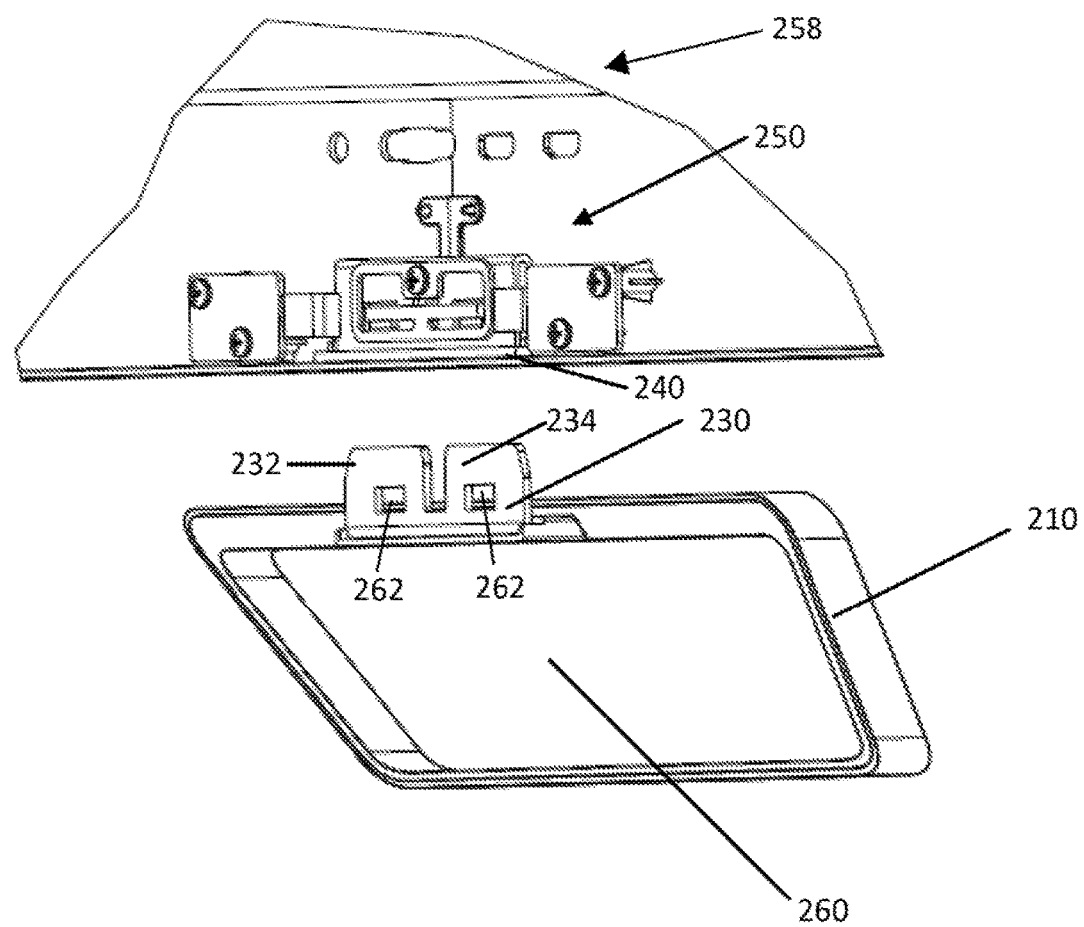
FIG. 8 depicts a close-up view of the stand frame and the hinge of the system depicted in FIG. 6 in accordance with an aspect of the present disclosure.

Moving now to FIG. 8, this figure depicts a close-up view of the stand frame 210 and the hinge 250 of the system depicted in FIG. 6 in accordance with an aspect of the present disclosure. As shown, the stand frame 210 includes a hollow rounded rectangular portion 260 and the vertical stand tongue 230. The stand frame 210 also includes a connector portion (not shown) to connect with the wedge-shaped base component (shown in FIGS. 6 and 7). The vertical stand tongue 230 includes a first protrusion 232 and a second protrusion 234. Each of the first protrusion 232 and second protrusion 234 includes an opening 262 to couple with the previously mentioned capturing mechanisms (e.g., hooks) of the hinge sleeve component 240.

While shown as being visible in FIG. 8 for the sake of clarity, it should be understood that the hinge 250 is substantially concealed behind a cover portion 258 of the display device 220, and only the hinge sleeve component 240 is exposed on the lower portion of the display device 220 so that the vertical stand tongue 230 may be inserted therein.

Figure 9:
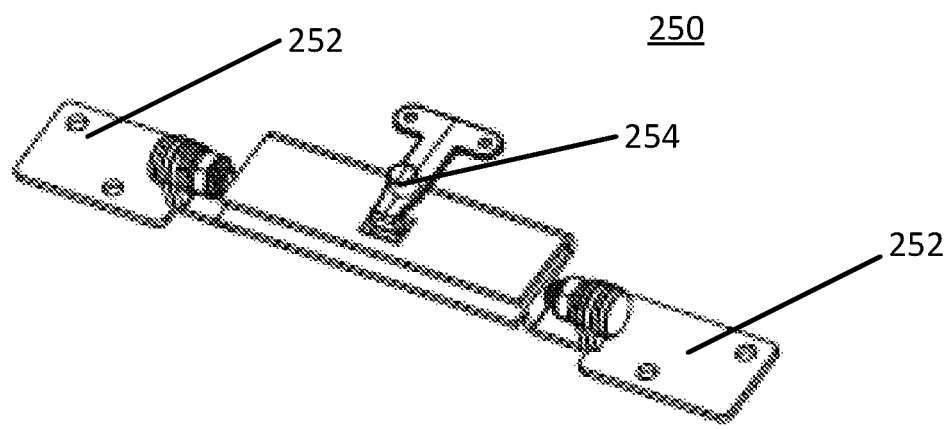
FIG. 9 depicts another close-up view of the hinge of the system depicted in FIG. 6 in accordance with an aspect of the present disclosure.

Turning now to FIG. 9, this figure depicts the hinge 250 from another angle in accordance with an example. Among other things, this hinge 250 enables the display device 220 to rotate with respect to the stationary stand frame 210. In addition, a bracket portion 252 of the hinge 250 enables the hinge 250 to be affixed to a portion of the display device 220, and to rotate with the display device 220 while the hinge sleeve component 240 remains stationary.

In addition to the above, the hinge 250 also includes a release button 254. When the release button 254 is depressed, it may disengage retention tabs from the inserted vertical stand tongue 230 (not shown), and thereby allow the vertical stand tongue 230 to be slid out from the hinge sleeve component 240 in the vertical direction.

The above discussion is meant to be illustrative of the principles and various implementations of the present disclosure. Numerous variations and modifications will become apparent to those skilled in the art once the above disclosure is fully appreciated. It is intended that the following claims be interpreted to embrace all such variations and modifications.

What is claimed is:

1. A system, comprising:
a stand frame including a stand tongue comprising at least one protrusion, the at least one protrusion including an opening; and
a display device that is selectively attachable to the stand frame, the display device comprising a hinge arranged underneath a cover portion of the display device to substantially conceal the hinge,
the cover portion comprising a hinge sleeve component that protrudes from the display device and comprises a cavity to receive and conceal the stand tongue, the hinge sleeve component comprising at least one capturing mechanism,
wherein the stand tongue is to insert into the cavity and the at least one capturing mechanism is to engage the opening of the at least one protrusion to attach the stand frame to the display device, and
wherein the stand tongue is to detach from the cavity by depression of a release button located on the hinge sleeve component.

2. The system of claim 1, wherein the hinge enables the display device to rotate with respect to the stand frame.

3. The system of claim 1, wherein the hinge comprises a hinge bracket that rotates with the display device while the hinge sleeve component remains stationary.

4. The system of claim 1, further comprising a wedge-shaped base component, wherein the stand frame is to attach to the wedge-shaped base component.

5. The system of claim 1, wherein the display device comprises a monitor, an all-in-one desktop computer, a tablet computer, a television, or a combination thereof.

6. The system of claim 1, wherein the stand tongue protrudes substantially horizontally from the stand frame.

7. A system, comprising:
a stand frame including a substantially vertical stand tongue comprising at least one protrusion and the at least one protrusion including an opening; and
a display device that is selectively attachable to the stand frame, the display device comprising a hinge arranged underneath a cover portion of the display device to substantially conceal the hinge,
wherein the hinge includes a hinge sleeve component accessible from a bottom portion of the display device, the hinge sleeve component comprising a cavity to receive and conceal the substantially vertical stand tongue and further comprising at least one capturing mechanism to engage the opening of the at least one protrusion of the substantially vertical stand tongue when the substantially vertical stand tongue is inserted into the hinge sleeve component,
wherein the substantially vertical stand tongue is to insert into the cavity of the hinge sleeve component to attach the stand frame to the display device, and
wherein the substantially vertical stand tongue is to detach from the cavity of the hinge sleeve component by depression of a release button located on the hinge.

8. The system of claim 7, wherein the hinge enables the display device to rotate with respect to the stand frame.

9. The system of claim 7, wherein the hinge comprises a hinge bracket which rotates with the display device while the hinge sleeve component remains stationary.

10. The system of claim 7, wherein the display device comprises a monitor, an all-in-one desktop computer, a tablet computer, a television, or a combination thereof.

11. The system of claim 7, further comprising a wedge-shaped base component, wherein the stand frame is to attach to the wedge-shaped base component.

12. A system, comprising:
a stand frame including a stand tongue protruding substantially vertically or substantially horizontally from the stand frame, the stand tongue comprising a protrusion including an opening; and
a display device that is selectively attachable to the stand frame, the display device including a hinge arranged underneath a cover portion of the display device to substantially conceal the hinge,
wherein the stand tongue is to insert into a cavity of a hinge sleeve component of the hinge comprising a capturing mechanism to engage the opening of the protrusion to attach the stand frame to the display device, the cavity to receive and conceal the stand tongue,
wherein the stand tongue is to detach from the cavity of the hinge sleeve component by depression of a release button located on the hinge sleeve component or located on the hinge, and
wherein the hinge enables the display device to rotate with respect to the stationary stand frame and stationary hinge sleeve component.

* * * * *

UNITED STATES PATENT AND TRADEMARK OFFICE
CERTIFICATE OF CORRECTION

PATENT NO. : 10,317,936 B2
APPLICATION NO. : 15/023280
DATED : June 11, 2019
INVENTOR(S) : In Shr Tseng et al.

Page 1 of 1

It is certified that error appears in the above-identified patent and that said Letters Patent is hereby corrected as shown below:

On the Title Page

In item (71), Applicant, in Column 1, Line 1, delete "HEWLETT PACKARD" and insert -- HEWLETT-PACKARD --, therefor.

Signed and Sealed this
Twenty-second Day of October, 2019

Andrei Iancu
*Director of the United States Patent and Trademark Office*